(12) United States Patent
Hewitt

(10) Patent No.: US 6,681,216 B2
(45) Date of Patent: Jan. 20, 2004

(54) DELAYED UNLOADING OF A DYNAMICALLY LOADABLE FILE

(75) Inventor: James A. Hewitt, Meridian, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/865,806

(22) Filed: May 25, 2001

(65) Prior Publication Data

US 2003/0208520 A1 Nov. 6, 2003

Related U.S. Application Data

(63) Continuation of application No. 09/288,942, filed on Apr. 9, 1999, now Pat. No. 6,308,184.

(51) Int. Cl.[7] .............................................. G06F 17/30
(52) U.S. Cl. .............................. 707/1; 707/5; 707/10; 707/104.1; 707/200; 707/205
(58) Field of Search .................. 707/1, 5, 10, 100–103, 707/104.1, 200–206; 711/129, 173; 710/68, 200; 714/8; 713/321; 709/227, 239, 250, 4, 152, 153

(56) References Cited

U.S. PATENT DOCUMENTS

| | | | | |
|---|---|---|---|---|
| 5,708,811 A | * | 1/1998 | Arendt et al. | 717/163 |
| 5,761,529 A | * | 6/1998 | Raji et al. | 710/4 |
| 5,761,667 A | * | 6/1998 | Koeppen | 707/100 |
| 5,881,221 A | * | 3/1999 | Hoang et al. | 714/38 |
| 5,963,963 A | | 10/1999 | Schmuck et al. | 707/205 |
| 5,987,477 A | | 11/1999 | Schmuck et al. | 707/201 |
| 5,996,082 A | | 11/1999 | Cortopassi | 713/321 |
| 6,009,274 A | | 12/1999 | Fletcher | 717/11 |
| 6,009,476 A | * | 12/1999 | Flory et al. | 709/324 |
| 6,018,806 A | | 1/2000 | Cortopassi et al. | 714/8 |
| 6,021,508 A | | 2/2000 | Schmuck et al. | 714/4 |
| 6,032,216 A | | 2/2000 | Schmuck et al. | 710/200 |
| 6,044,367 A | | 3/2000 | Wolff | 707/2 |
| 6,067,545 A | | 5/2000 | Wolff | 707/10 |
| 6,101,508 A | | 8/2000 | Wolff | 707/1 |
| 6,141,688 A | | 10/2000 | Bi et al. | 709/227 |
| 6,148,344 A | | 11/2000 | Gladwin et al. | 709/250 |

* cited by examiner

Primary Examiner—Hani M. Kazimi
Assistant Examiner—Ella Colbert
(74) Attorney, Agent, or Firm—Lane R. Simmons

(57) ABSTRACT

A dynamically loadable file, such as a dynamically loadable device driver or library, is delayed from being unloaded from memory for improved memory management and processing operations including reduced unload/load cycles. Prior to terminating execution of select functions, a dynamically loadable driver spawns a delay process that loads the driver and keeps it loaded for a period of time beyond that which it would normally be loaded. Thus, even after a calling process unloads the driver, it remains loaded for a period of time longer because of the spawned delay process and allows the operating system or an application/process to use the driver again within the delay time without requiring the driver to be re-copied into memory or re-initialized. The delay process safely increments the operating system reference count for the driver to keep the driver loaded and then monitors a delay time to subsequently unload the driver.

5 Claims, 5 Drawing Sheets

DELAYED UNLOADING OF A DYNAMICALLY LOADABLE FILE

This is a continuation of application Ser. No. 09/288,942 filed on Apr. 4, 1999 now U.S. Pat. No. 6,308,184, which is hereby incorporated by reference herein.

FIELD OF THE INVENTION

This invention relates in general to computer peripheral device drivers and, more particularly, to dynamically loadable printer drivers.

BACKGROUND OF THE INVENTION

A device driver is software that controls a hardware component or peripheral device of a computer, such as a printer. A device driver is responsible for accessing the hardware registers of the device and often includes an interrupt handler to service interrupts generated by the device or an application executing on the computer. Conventionally, a device driver was linked to the operating system (O.S.) kernel when the kernel was built. However, recent operating systems have dynamically loadable/linkable device drivers that are installed from files after the operating system is running. For example, in the Windows® 95/98 operating systems provided by Microsoft Corp., dynamically loadable/linkable drivers (files or code) are identified with a .DRV extension in the file name, and dynamically loadable libraries are identified with a .DLL extension. More recently, dynamically loadable code in general, whether it be a "driver" or a "library", is identified simply with a .DLL extension. Such operating systems, drivers, and/or libraries provide flexibility for overall memory management operations and computing performance efficiency considerations. For purposes of this discussion, a dynamically loadable/linkable driver, library and/or other code having data and/or executable instructions will simply be referred to herein as a DLL file. Additionally, the terms "load" and "link" will be referred to jointly herein simply as "load". Moreover, the discussion will occur in the context of a printer driver, although other drivers and/or dynamically loadable/linkable files are equally applicable.

Typically, the operating system "loads" a DLL file when an application or other executing process requests to use it. An application is a self-contained program that performs a specific function or duty, typically for the user. Examples include a word processor, graphic design package, electronic mail program, etc. Generally, the O.S. loads the DLL file by: (i) copying the DLL file from an external storage medium, such as a disk drive, into random access memory (RAM) for execution if it is not already resident in RAM, (ii) setting and/or incrementing an internal reference count for that DLL file, (iii) initializing the DLL file, and (iv) linking the application/process with the DLL file (or in other words, establishing communication between the application and the DLL file) so that the application can execute any one of a collection of functions residing in the DLL file. The internal reference count allows the O.S. to track how many applications or processes are currently using the DLL file. This enables the O.S. to determine whether or not the DLL file is already resident in memory and to bring it into memory (RAM) only if it is not already resident. For example, if the DLL file is not already resident in memory (i.e., the reference count is zero), then a "load" of the DLL file includes placing it in memory (i.e., copied from disk) for execution and setting/incrementing the reference count. On the other hand, if the DLL file is already resident in memory when an application needs to use it (i.e., the reference count is a non-zero value), then a "load" simply includes incrementing the reference count to reflect another use of the DLL file.

Additionally, the reference count enables the O.S. to determine when to unload the DLL file. Generally, the O.S. unloads the DLL file by (i) decrementing the internal reference count for that DLL file, (ii) de-initializing the DLL file, and (iii) unlinking the application/process from the DLL file (or in other words, breaking communication between the application and the DLL file) and removing the DLL file out of RAM (i.e., marking its memory space as unused). For example, if no other application is currently using the DLL file (i.e., if the reference count will go to zero) when an application completes its use of the DLL file, then an "unload" includes decrementing the reference count and removing the DLL file from memory (marking its memory space as "unused"). If another application/process is currently using the DLL file (i.e., the reference count will not go to zero), then an "unload" simply includes decrementing the reference count, and the DLL file is kept resident in memory for continued use by the other application(s).

The loading and unloading of a DLL file can occur multiple times over a very short period of time. For example, when an application is initially launched (executed), a printer driver DLL file is loaded and unloaded multiple times by the O.S. for the application to initially establish communication with the printer device. An application initiates communication with a DLL file by creating (requesting via the O.S.) a device context for that device DLL file. This is commonly referred to as a "CreateDC( )" command in a Windows 95/98 environment and is the mechanism that enables the O.S. to establish the communication structure and parameters between the application and the driver DLL file. To this regard, in a printer driver context, a CreateDC( ) or similar command typically executes a series of "query" functions including, for example, the O.S. loading the printer driver to determine what the driver version number is (i.e., executing a driver version detect function in the DLL file), and then unloading the driver; loading the printer driver to inquire what the resolution capability of the printer is (i.e., executing a resolution detect function in the DLL file), and then unloading the driver; loading the printer driver to inquire what paper size the printer supports (i.e., executing a paper size detect function in the DLL file), and then unloading the driver; loading the printer driver to inquire what the paper orientation is (i.e., executing an orientation detect function in the DLL file), and then unloading the driver; and so forth for other printer features also. Finally, after this series of loading/unloading occurs to query the printer driver, an "enabling" function is executed in the DLL file to enable or create the device context for the driver for further use by the application.

As indicated, the sequence of the above noted load/unload functions may be performed by the O.S. for each CreateDC( ) command executed by the application. Other functions provided by the DLL file may also be called by the application once the device context is established. In any case, after the application has completed its calls to the DLL file subsequent to a CreateDC( ) command, the application executes a DeleteDC( ) command to break the communication link between the application and the DLL file. In other words, the O.S. "unloads" the driver. Note also that an application may execute CreateDC( ) and DeleteDC( ) commands multiple times in its program code, depending on design criteria, desired execution efficiency, memory considerations, and other factors.

Although one idea behind unloading a DLL file is to free up memory resources, a potential effect of multiple instances of loading and unloading a DLL file in a short period of time is to undesirably tax a system's processor and memory resources because of the intensive file and memory management activities that occur. Additionally, the initialization and de-initialization of the DLL file each time it is loaded into memory and subsequently unloaded causes a lot of code to be processed repeatedly which can be perceived as a performance problem. Notably, this performance penalty becomes more severe the larger the DLL file becomes and the more complex the initialization and de-initialization code becomes (as drivers become more and more sophisticated). Disadvantageously, these events can result in undesirable processing delays that may even be noticed by a user.

Accordingly, an object of the present invention is to provide a tool and method for managing dynamically loadable/linkable files.

SUMMARY OF THE INVENTION

According to principles of the present invention in a preferred embodiment, a dynamically loadable file, such as a DLL device driver or library, is delayed from being unloaded from memory for improved memory management and processing operations including reduced unload/load cycles. Prior to terminating execution of a given library function, a DLL driver spawns a delay process that loads the driver and keeps it loaded for a period of time beyond that which it would normally be loaded relative to its calling process. Thus, even after a calling process unloads the driver, it remains loaded for a period of time longer because of the spawned delay process, thereby allowing the operating system or an application/process to use the driver again within the delay time without requiring the driver to be re-copied into memory or re-initialized. The delay process safely increments the operating system reference count for the driver to keep the driver loaded and then monitors a delay time event to subsequently unload the driver.

Other objects, advantages, and capabilities of the present invention will become more apparent as the description proceeds.

DETAILED DESCRIPTION OF THE INVENTION

Figure 1:
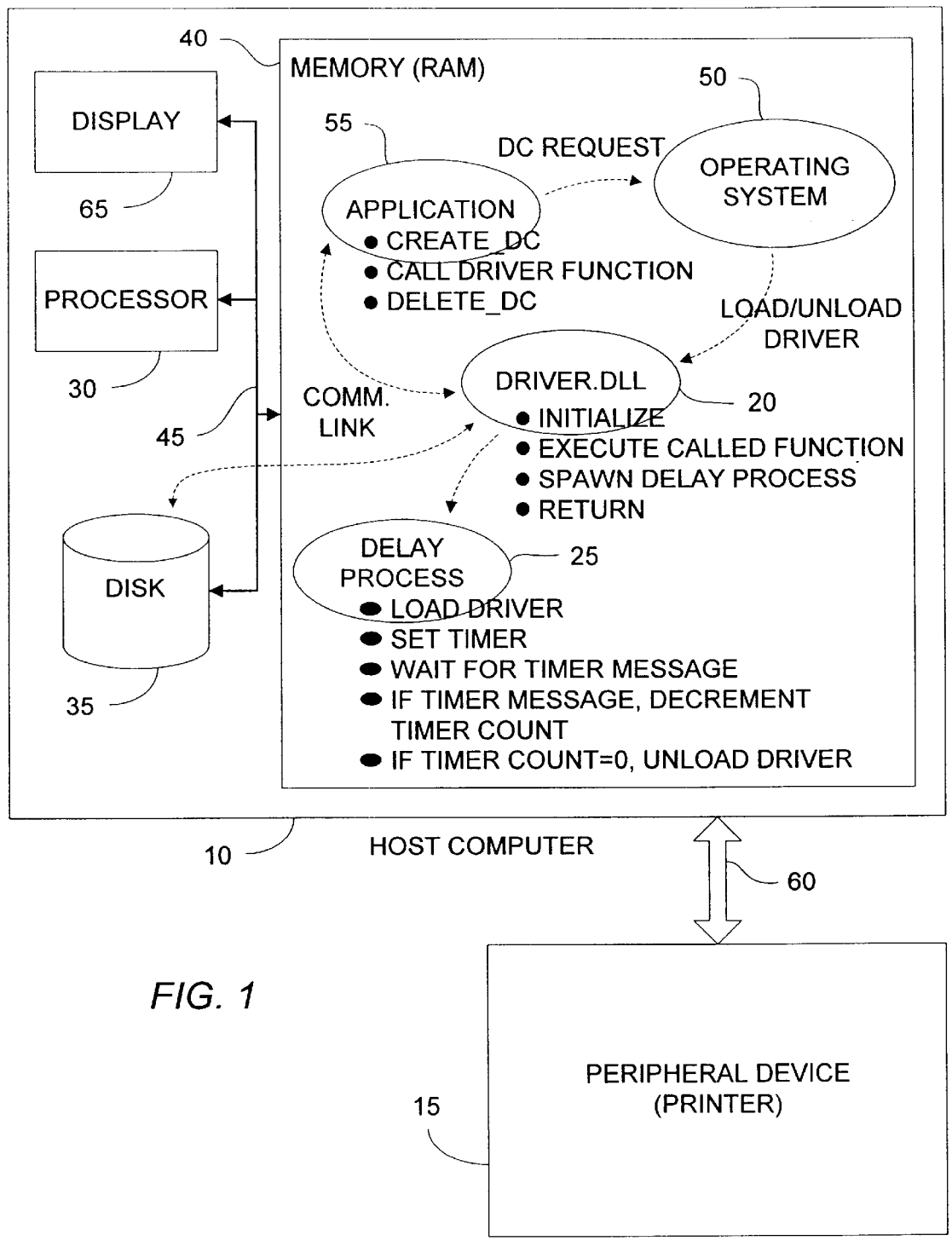
FIG. 1 is a block diagram of a host computer and peripheral printer device, wherein a dynamically loadable printer driver and delay process are employed according to one embodiment of the present invention.

FIG. 1 is a block diagram of a host computer 10 and peripheral printer device 15, wherein a dynamically loadable printer driver 20 and delay process 25 are employed according to one embodiment of the present invention. Host computer 10 is any conventional computing device, such as a personal computer, having a processor 30, a disk drive 35, and random access memory (RAM) 40, all communicating via bus 45. Host computer 10 is enabled to execute a conventional operating system 50 that is capable of executing at least one application 55, and that is capable of loading and unloading a dynamically loadable driver or library 20, commonly referred to as a .DRV or .DLL file respectively (again, referred to herein jointly as a DLL file for ease of discussion purposes). Disk drive 35 may be a local drive or a remote (networked) drive. For purposes of discussion, peripheral device 15 is a printer, such as a conventional laser printer, and is coupled to host computer 10 via conventional cabling or other wireless technology 60. It should be noted, however, that the present invention is similarly applicable to other peripheral devices, including other imaging devices such as a copier, facsimile machine, scanner, or the like. purposes). Disk drive 35 may be a local drive or a remote (networked) drive. For purposes of discussion, peripheral device 15 is a printer, such as a conventional laser printer, and is coupled to host computer 10 via conventional cabling or other wireless technology 60. It should be noted, however, that the present invention is similarly applicable to other peripheral devices, including other imaging devices such as a copier, facsimile machine, scanner, or the like.

Dynamically loadable driver 20 enables computer 10 to print to printer 15 and includes executable code (instructions) for providing user interface capabilities for displaying on display 65 and other conventional functions for communicating with printer 15. Exemplary functions include, but are not limited to, a driver version detect function, a resolution detect function, a paper size detect function, and a paper orientation detect function.

Importantly, under principles of the present invention in a preferred embodiment, driver 20 includes executable instructions for spawning a delay process 25. Delay process 25 is a special application provided with driver 20 for printer 15 in this example. However, delay process 25 is also similarly applicable to other printers and/or peripherals. Preferably, delay process 25 is spawned near the end of execution of one or more selected functions in driver 20 where it is not unreasonable to expect that there will be another call into the driver. As a spawned process (i.e., a "child" process of driver 20 in a multitasking operating system), delay process 25 executes independently of driver 20 and provides a tool for "delaying" the unloading of driver 20 by loading driver 20 and safely incrementing the O.S. internal reference count for the driver. Delay process 25 is not visible or noticed by a user. However, it delays the unloading of driver 20 long enough to give O.S. 50 or the printing application 55 sufficient chance to load driver 20 again (if needed) while driver 20 is still loaded in memory 40 by delay process 25. By keeping driver 20 loaded for an extended period, the performance overhead of O.S. 50 for reloading driver 20 is mitigated. In other words, unload/load cycles are reduced.

Figure 2:
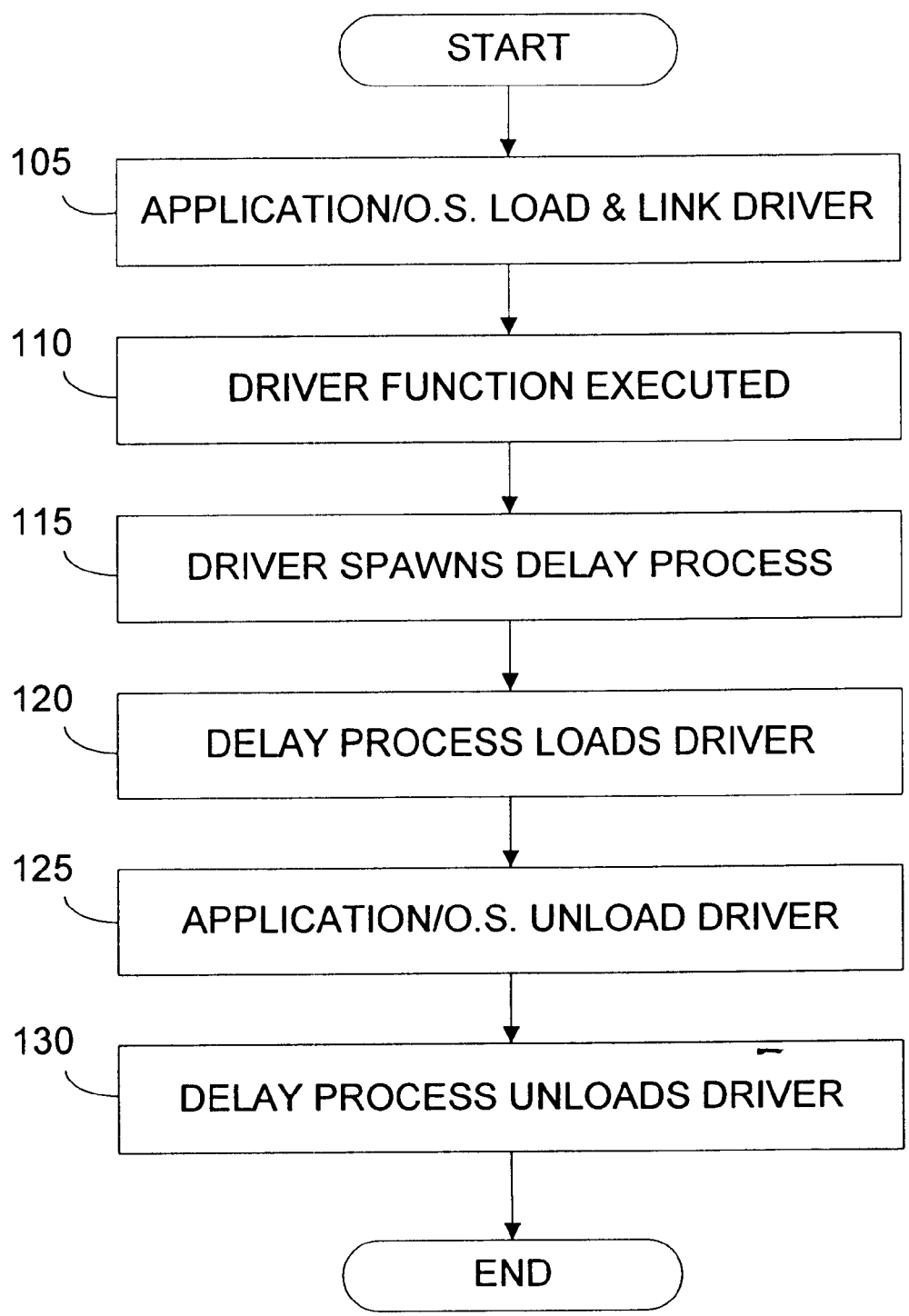
FIG. 2 is a flow chart depicting a preferred method of the present invention for delaying the unloading of a DLL file.

Referring now to FIGS. 2–7, these flow charts depict a preferred method of the present invention and are best understood in context of also referring to FIG. 1. To this regard, FIG. 2 is an overview process of the invention for loading and unloading a dynamically loadable file wherein the DLL file is delayingly unloaded. First, 105, an application/process 55 loads a DLL driver 20. This is accomplished, for example, by executing a "create-device-context" (CreateDC( )) command (or similar command) to have O.S. 50 load driver 20. Subsequently, O.S. 50 or application 55 executes a function call 110 to driver 20. For example, in the case of O.S. 50 initially enabling and loading driver 20 in response to a CreateDC( ) command, a query function call is executed such as for detecting the driver version number or for detecting the resolution of printer 15, etc. Importantly, after the function is executed 110, driver 20 spawns 115 delay process 25. Once spawned, delay process 25 executes independently of application 55 and executes a load command 120 to load driver 20 whereby the internal reference count is incremented in O.S. 50 for the driver.

It should be noted here that in a preferred embodiment, delay process 25 is spawned only after a certain function or functions execute in driver 20 where it is not unreasonable to expect that there will be another call into the driver. For example, delay process 25 is spawned after any query function and after a disable driver function.

When application/process 55 completes its use of driver 20, the driver is unloaded 125. This is accomplished, for example, by the application executing a "delete-device-context" (DeleteDC( )) command (or similar command) to have O.S. 50 unload driver 20 and decrement the reference count. However, delay process 25 keeps driver 20 loaded for a while even after application 55 unloads it since delay process 25 previously loaded the driver 120 which caused O.S. 50 to increment the reference count. Only after a given event, such as a timer event, does delay process 25 unload 130 driver 20 by further decrementing the reference count and/or removing the driver from memory 40. Importantly, keeping driver 20 loaded for this extra time period can significantly reduce overhead processing and memory manipulation requirements of O.S. 50. For example, driver 20 will not need to be copied in from disk 35 again if another driver load is initiated (i.e., by application 55, some other process, or O.S. 50) while the driver is still loaded by delay process 25. Additionally, the initialization and de-initialization code of driver 20 will not need to be re-executed since delay process 25 keeps driver 20 loaded.

Figure 3:
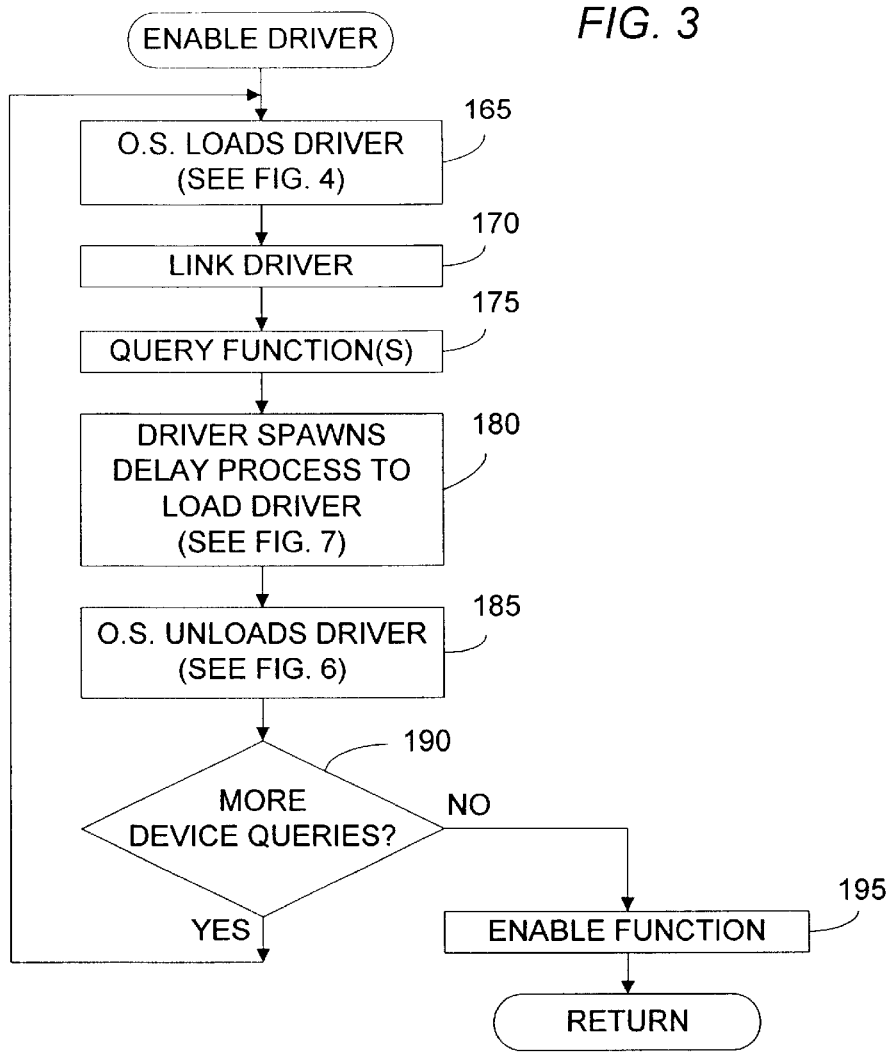
FIG. 3 is a flow chart depicting one embodiment of a method for enabling a DLL file.

FIG. 3 is a flow chart depicting a method of the present invention as embodied in association with an exemplary process of creating a device context (for example, CreateDC( )) for enabling a DLL file (driver 20) as initiated by application 55. First, 165, driver 20 is loaded into memory 40 by O.S. 50 (if it is not already resident there) and its reference count is set and incremented (see FIG. 4). Next, 170, driver 20 is linked to application 55 so that the application can execute the functions provided by driver 20. Subsequently, O.S. 50 executes one or more query functions 175 in driver 20 to establish a proper context with driver 20. Again, for driver 20 relative to printer 15, query functions may include, for example, detecting driver version, printer resolution, media size, media orientation, etc. Importantly, upon completion of or near the end of a query function 175, the present invention delay process 25 is spawned 180 by driver 20 to load driver 20. Only after delay process 25 is spawned 180 does O.S. 50 then unload 185 driver 20. However, advantageously, delay process 25 actually keeps driver 20 loaded in memory 40 for a while longer beyond the unload 185.

If more device queries are to occur 190, then O.S. 50 again loads (reloads) 165 driver 20. But, this time, driver 20 doesn't need to be copied in from disk 35 because delay process 25 has kept it loaded if the new load 165 occurs within the delay time set in delay process 25. Consequently, only the reference count for driver 20 is incremented (see FIG. 4). After the driver is linked 170 and another query function is executed 175, driver 20 again spawns 180 delay process 25. If delay process 25 is still executing from its previous spawn by driver 20, then the delay time for unloading driver 20 is simply reset. Otherwise, delay process 25 is spawned anew (see FIG. 7).

As can be seen, a series of query calls to driver 20 typically causes multiple loads and unloads of driver 20 as depicted by the looping flow in FIG. 3. However, the present invention delay process 25 in association with a DLL file 20 reduces the number of DLL unload/load cycles for improved performance and efficiency.

Finally, when all of the query functions have been executed 190 as dictated by O.S. 50, then the enable function 195 is executed in driver 20 by O.S. 50 to finish creating the device context by initializing the driver and associated hardware for enabling application 55 to use the library of functions provided by driver 20.

Figure 4:
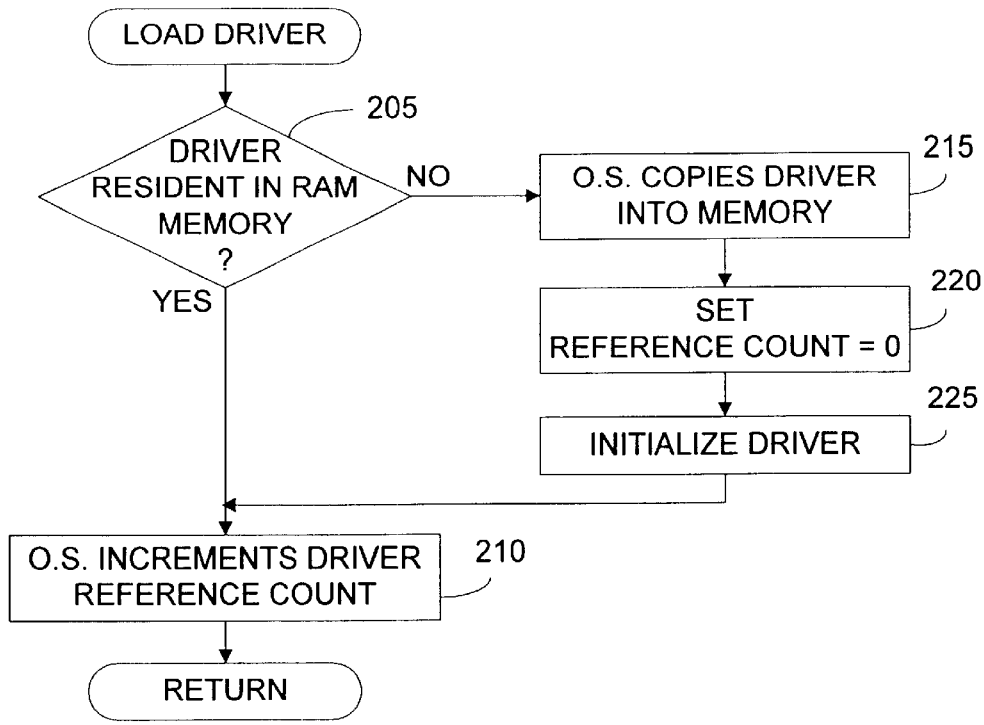
FIG. 4 is a flow chart depicting one embodiment of a method for loading a DLL file.

FIG. 4 is a flow chart of a method for loading a DLL file (driver 20) for use. First, if driver 20 is already resident 205 in memory 40, then O.S. 50 simply increments 210 an internal reference count for that driver 20. No other significant memory manipulations or re-initialization of driver code needs to occur. On the other hand, if driver 20 is not already resident 205 in memory 40, then O.S. 50 copies 215 the driver from disk 35 into memory 40. Additionally, O.S. 50 sets the reference count 220 for driver 20 equal to zero and initializes the driver 225 (i.e., executes the driver's initialization code). Subsequently, the internal reference count is incremented 210 to reflect the load.

It should be noted here that when delay process 25 loads driver 20 (see FIG. 2, 120; FIG. 3, 180; and FIG. 7, 355), it is loaded simply by O.S. 50 incrementing the internal reference count 210. This is sufficient because driver 20 is always already loaded in memory 205 anytime delay process 25 is spawned by driver 20.

Figure 5:
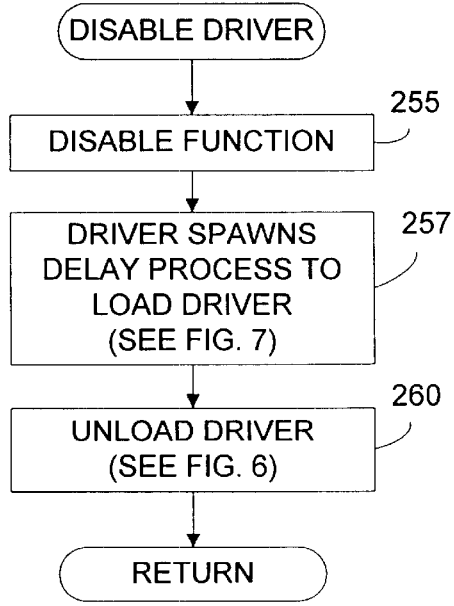
FIG. 5 is a flow chart depicting one embodiment of a method for disabling a DLL file.

FIG. 5 is a flow chart depicting a method of the present invention as embodied in association with an exemplary process of deleting a device context (for example, DeleteDC( )) for disabling a DLL file (driver 20) as initiated by application 55. First, a disable function 255 is executed in driver 20 for clearing the device context previously established. Next, upon completion of or near the end of disable function 255, the present invention delay process 25 is spawned 257 by driver 20 to load driver 20. Only after delay process 25 is spawned 257 does O.S. 50 then unload 260 driver 20 due to completion of the disable function 255. However, advantageously, delay process 25 actually keeps driver 20 loaded in memory 40 for a while longer beyond the unload 260. Importantly, this reduces unload/load cycles for driver 20 in the event driver 20 is again loaded (either by O.S. 50, application 55, or some other process) within the delay time set in delay process 25.

Figure 6:
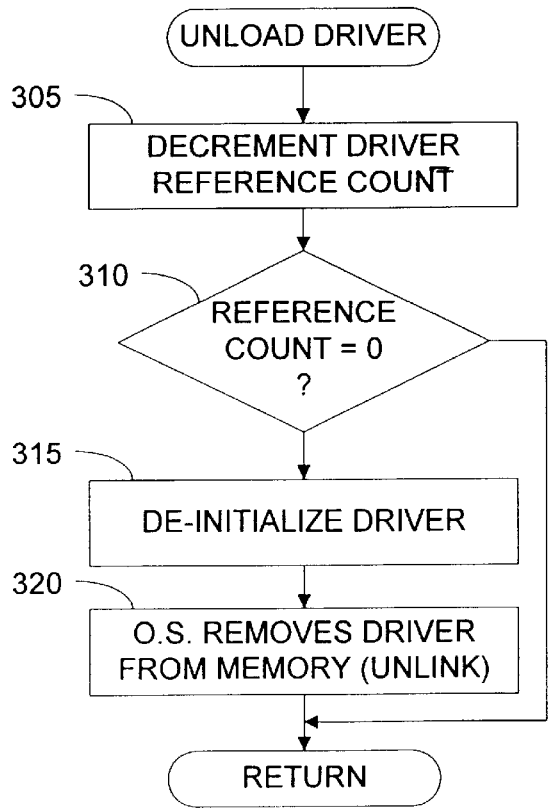
FIG. 6 is a flow chart depicting one embodiment of a method for unloading a DLL file.

FIG. 6 is a flow chart depicting a method for unloading a DLL file (driver 20) after use. First, 305, the internal reference count for driver 20 is decremented. Then, if the reference count equals zero 310, O.S. 50 de-initializes 315 driver 20 (i.e., executes de-initialization code) and removes it 320 from memory 40. As conventional in:the art, removal may be as simple as marking the memory space used by driver 20 as "unused".

If the reference count does not equal zero 310, O.S. 50 does nothing. In other words, the reference count indicates some application or process is still using driver 20 and, as such, it should not be removed from memory 40 at this time. For example, if application 55 initiated the unload after using driver 20, delay process 25 may still have the driver loaded under the present invention.

Figure 7:
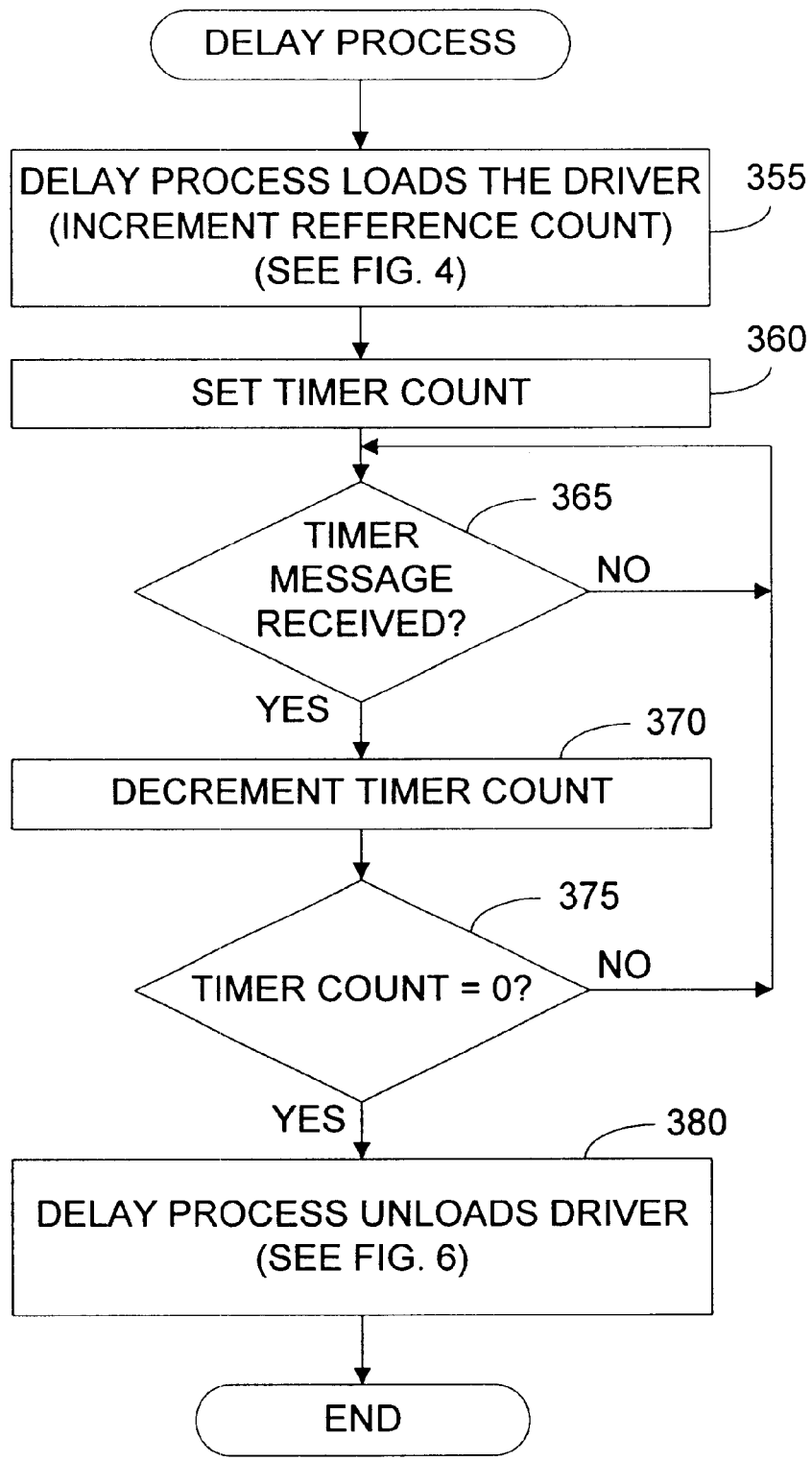
FIG. 7 is a flow chart depicting a preferred method for a delay process for delaying the unloading a DLL filed.

Referring now to FIG. 7, this flow chart depicts a preferred method of the present invention delay process 25.

When driver 20 spawns delay process 25, it passes certain command line parameters, including (i) an identifier that identifies the parent process (driver 20), and (ii) a time parameter that identifies how long delay process 25 is to keep driver 20 loaded. In general, these parameters enable delay process 25 to work for any DLL file without having to make a special delay process for each DLL file. In any case, once it is spawned, delay process 25 loads 355 driver 20. Since driver 20 is already loaded, the internal reference count in O.S. 50 is simply incremented (FIG. 4, steps 205, 210).

Subsequently, an event timer is set 360 using the time parameter passed in. In a preferred embodiment, the timer is simply a counter that decrements a time-to-live timer count value (initially the time parameter passed in) at each passage of a given interval of time. Preferably, the interval is derived in accordance with a system clock obtained from O.S. 50 and/or computer 10. For example, a preferred interval is every one second in time. However, other delay intervals are similarly applicable and may be tuned based on the speed of processor 30 and/or host 10.

Next, delay process 25 simply waits 365 until a timer message/event is received from O.S. 50 indicating the interval has lapsed. Although a "busy wait" loop is implied 365 in FIG. 7, an actual implementation in a Windows environment is event driven, i.e., the application releases control to the O.S. until an event is received. If a timer message is received 365 (for example, one second passes), then the time-to-live timer count is decremented 370. If the timer count is not zero 375, then delay process 25 simply waits for another timer message 365. This process of waiting for a timer message 365, and decrementing the timer count 370 continues until the time-to-live timer count equals zero. Once the event occurs such that the timer count equals zero, 375, delay process 25 unloads 380 driver 20 (see FIG. 6) and terminates.

Importantly, the internal reference count for driver 20 is safely increased in O.S. 50 when driver 20 is loaded by delay process 25. It is safely increased because driver 20 doesn't have to do anything to be sure that the reference count eventually goes to zero when it should. The reference count eventually goes to zero when the time-to-live timer count in delay process 25 is finally decremented to zero, thus ensuring that driver 20 will ultimately be unloaded. This occurs simply in a matter of time and relatively independent of what else is happening in computer 10.

It should also be noted that in a preferred embodiment, if delay process 25 already has driver 20 loaded when its command line is parsed, then driver 20 is not loaded again but, rather, delay process 25 simply resets its timer count to the new command line time parameter passed in.

In summary, the present invention provides a system and method for delaying the unloading of a dynamically loadable driver or library. Advantageously, driver performance and memory management is improved, and unload/load cycles are reduced. It will be obvious to one of ordinary skill in the art that the present invention is easily implemented utilizing any of a variety of components and tools existing in the art. Moreover, while the present invention has been described by reference to specific embodiments, it will be apparent that other alternative embodiments and methods of implementation or modification may be employed without departing from the true spirit and scope of the invention.

What is claimed is:

1. A computing device comprising:

(a) a processor;

(b) a memory coupled to the processor;

(c) a dynamically loadable file stored in the memory and configured to be dynamically loaded for execution in response to a calling process, the file including instructions for spawning a delay process; and, (d) the delay process stored in the memory, the delay process having instructions for dynamically loading the file prior to the calling process initiating an unload of the file such that the file Is retained as loaded even after the calling process initiates an unload of the file, and wherein the delay process further includes instructions configured to dynamically unload the file after an expired amount of time.

2. The computing device of claim 1 wherein the dynamically loadable file is a device driver.

3. The computing device of claim 2 wherein the device driver is for an imaging device.

4. A computing system, comprising:

(a) a peripheral device;

(b) a host computer coupled to the peripheral device; and, (c) a dynamically loadable driver stored in a memory on the host computer for interfacing the peripheral device with the host computer upon loading of the driver by a calling process, the driver including instructions for spawning a delay program in the memory; and, (d) the delay program including Instructions for dynamically loading the driver upon the delay program being spawned and prior to the calling process unloading the driver such that the driver remains loaded even after the calling process initiates an unload of the driver.

5. The computing system of claim 4 wherein the peripheral device includes an imaging device.

* * * * *